US008397480B2

(12) United States Patent
Jaeker et al.

(10) Patent No.: US 8,397,480 B2
(45) Date of Patent: Mar. 19, 2013

(54) ENERGY GUIDING CHAIN

(75) Inventors: Thilo-Alexander Jaeker, Sankt Augustin (DE); Andreas Hermey, Hennef (DE); Stephan Strack, Konigswinter (DE); Michael Offner, Garching b. Munchen (DE)

(73) Assignee: igus GmbH, Cologne (DE), `

( * ) Notice: Subject to any disclaimer, the term of this patent is extended or adjusted under 35 U.S.C. 154(b) by 0 days.

(21) Appl. No.: 13/264,891

(22) PCT Filed: Apr. 15, 2010

(86) PCT No.: PCT/EP2010/054981
§ 371 (c)(1),
(2), (4) Date: Jan. 3, 2012

(87) PCT Pub. No.: WO2010/119104

PCT Pub. Date: Oct. 21, 2010

(65) Prior Publication Data

US 2012/0096828 A1 Apr. 26, 2012

(30) Foreign Application Priority Data

Apr. 17, 2009 (DE) ...................... 20 2009 005 650 U (51) Int. Cl.
*F16G 13/16* (2006.01)
(52) U.S. Cl. ................ 59/78.1; 59/900; 248/49; 248/51
(58) Field of Classification Search .................. 59/78.1, 59/900; 248/49, 51
See application file for complete search history.

(56) References Cited

U.S. PATENT DOCUMENTS 3,197,954 A * 8/1965 Merker et al. ................ 59/78.1
4,373,324 A 2/1983 Janos
(Continued)

FOREIGN PATENT DOCUMENTS

DE 1449670 12/1968
DE 2220044 11/1973
(Continued)

OTHER PUBLICATIONS

PCT International Search Report dated May 25, 2011 received in corresponding PCT Application No. PCT/EP10/54981, 4 pgs.

(Continued)

*Primary Examiner* — David B Jones
(74) *Attorney, Agent, or Firm* — Grossman Tucker Perreault & Pfleger, PLLC (57) ABSTRACT

The invention relates to an energy guiding chain for guiding cables, hoses and the like with a number of tubular chain links (1) connected together in an articulated manner and designed so that the surface of the top panels (5), bottom panels (2) and at least the transition areas (11) of these panels and the side panels (3, 4) are convexly curved in the circumferential direction of the tubular chain links (1), said chain links each having a bottom panel (5), comprising thereon laterally adjoining, opposite side panels (3, 4) and a top panel (5), whereupon the top panel (5) is detachably connected to the side panels (3, 4), the side panels (3, 4) in each case having a joint pin (6) and a joint opening (7) to connect flexibly, the pivoting angle of both directions of pivot being limited by stops (8) and the top panels (5), side panels (3, 4) and bottom panels (2); of adjacent chain links (1) overlapping telescopically over the entire pivoting angle.

21 Claims, 5 Drawing Sheets

U.S. PATENT DOCUMENTS

| | | | |
|---|---|---|---|
| 6,051,789 A | 4/2000 | Kato | |
| 6,161,373 A | 12/2000 | Heidrich et al. | |
| 6,374,589 B1 * | 4/2002 | Kunert et al. | 59/78.1 |
| 6,510,682 B2 * | 1/2003 | Komiya et al. | 59/78.1 |
| 6,966,527 B2 | 11/2005 | Komiya | |
| 7,584,597 B2 * | 9/2009 | Blase et al. | 59/78.1 |

FOREIGN PATENT DOCUMENTS

| | | | |
|---|---|---|---|
| DE | 3613431 | | 10/1987 |
| DE | 9109422 | | 10/1991 |
| DE | 4302757 | * | 3/1994 |
| DE | 102006030086 | | 1/2008 |
| EP | 1388700 | | 2/2004 |
| JP | 2163545 | * | 6/1990 |

OTHER PUBLICATIONS

PCT Translation of the International Preliminary Report on Patentability/Written Opinion issued Oct. 18, 2011, received in corresponding PCT Application No. PCT/EP10/54981, 7 pgs.

German Search Report dated Jan. 12, 2011, received in corresponding German Application No. 20 2009 005 650.3, 4 pgs.

* cited by examiner

ENERGY GUIDING CHAIN

The invention concerns an energy guide chain for guiding cables, hoses and the like between two connection points movable relative to each other, comprising a number of hingedly interconnected tubular chain links which each have a bottom wall, oppositely disposed side walls laterally adjoining same and a top wall, wherein the top wall is removably connected to the side walls, the side walls each have a respective hinge pin and a hinge opening for hingedly connecting adjacent chain links, the pivotal angle in both pivotal directions is limited by abutments and the top walls, side walls and bottom walls of adjacent chain links are in telescopically overlapping relationship over the entire pivotal angle.

Substantially closed energy guide chains of that kind are used in an environment in which there is the danger that foreign bodies can penetrate into the chain such as for example in machine tools, in particular machines for cutting machining of metal bodies, in which chips drop on to the surface of the energy guide chains and can penetrate between the chain links upon the pivotal movement thereof into the direction-changing deflection arc or out of the direction-changing deflection arc, and into the interior thereof.

To manage with as few parts and thus connecting locations as possible the bottom wall can be formed integrally with the side walls.

An energy guide chain of the kind set forth in the opening part of this specification is known from DE 36 13 431 A1. In that chain the top walls and the bottom walls of successive chain links telescopically overlap. In conjunction with the cranked configuration of the side walls that affords a tubularly closed internal space which is substantially protected from ingress thereinto of dirt and spray water.

In spite of the known closed configuration of the chain foreign bodies with sharp edges such as for example chips can remain caught at the surfaces of the chain links and can pass between the mutually overlapping edges of adjacent chain links when the energy guide chain moves, where they lead to damage in the overlapping regions and from where they can work their way forward into the chain interior.

Therefore the object of the invention is to develop an energy guide chain of the kind set forth in the opening part of this specification, in such a way that the penetration of foreign bodies into the interior of the chain can be still better avoided.

According to the invention that object is attained in that the surface of the top walls, bottom walls and at least the transitional zones of those walls and the side walls are convexly curved.

In particular it can be provided that the entire surface of the tubular chain links is in the form of a surface which is convexly curved in the peripheral direction.

In that case the radius of curvature in the region of the side walls, top wall, bottom wall and the transitional zones between the walls can vary so that this gives approximately a box shape for the chain links, with curved walls.

By virtue of the curvature in the peripheral direction, in particular of the top wall, the bottom wall and the transitional zones between those walls and the side walls, foreign bodies cannot lodge there as easily as on flat regions on which they can better collect. When the energy guide chain moves foreign bodies which nonetheless are deposited on the curved surfaces can fall off more easily.

In particular it may be advantageous if the chain links are of such a configuration that their outsides in cross-section are shaped symmetrically relative to the axis connecting the center of the two oppositely disposed side walls.

It is preferably provided that the outsides of the telescopically overlapping regions of the chain links in sections perpendicularly to the pivot axes of the hinge pins and the hinge openings have curvatures which are substantially concentric with respect thereto. They can extend at least over the entire pivotal angle.

The surface curvature provided not only in the peripheral direction of the tubular chain links but also perpendicularly to the pivot axes makes it possible for foreign bodies to slip off more easily, even in the longitudinal direction of the chain.

In a preferred embodiment of the invention the surface of the chain links is in the form of a surface which is steadily curved in all directions. With that configuration the formation of any edges at which foreign bodies can be deposited is avoided. As the surface does not have any flat regions, any foreign bodies which are possibly incident on the surface fall off the energy guide chain in a correspondingly easier fashion.

The regions of the top wall and the bottom wall which telescopically outwardly overlap the top wall and the bottom wall respectively of an adjacent chain link can be in the form of scrapers which bear against the top wall and the bottom wall respectively of the adjacent chain link. In addition the regions serving as scrapers can bear under a prestressing against the top wall and the bottom wall respectively of the adjacent chain link.

The top wall and optionally also the bottom wall, if the latter should be formed separately, can preferably also bear against the side walls under a prestressing.

The specified measures contribute to substantially preventing foreign bodies and fluids from penetrating into the interior of the energy guide chain.

A further contribution to that purpose is also afforded by the feature whereby the telescopically overlapping surfaces of the chain links in sections perpendicularly to the pivot axes of the hinge pins and hinge openings have curvatures which are substantially concentric relative thereto and which extend at least over the entire pivotal angle.

In a preferred embodiment the connecting regions between the side walls and the top wall of a chain link are in the form of a groove-and-tongue connection. Such a connection has the advantage that dirt and other foreign bodies are additionally prevented from passing through the connecting regions into the interior of the energy guide chain.

As a preferred alternative it can be provided that the edge portions, which bear against each other, of the side walls and the top wall overhang each other stepwise. That configuration of the edge portions additionally prevents dirt and other foreign bodies from penetrating into the interior of the chain.

In an advantageous configuration of the invention the top walls have fixing tongues which extend down from their side edges to the side walls and which can be releasably connected to the side walls.

In particular a latching connection between the fixing tongues and the side walls of the chain link can be provided as the connection there.

The fixing tongues at their inside can have a projection which latchingly engages into an outwardly open recess arranged in the side wall in question, wherein the outside of the fixing tongue is in alignment with the edge of the recess.

For making the latching connection the recess can have a latching nose, under which the projection engages. Preferably the latching connection is of such a configuration that the top wall bears on the side wall in question under a prestressing. The prestressing also contributes to ensuring that no dirt and no other foreign bodies penetrate into the interior of the chain between the top wall and the side walls in question.

To open the latching connection it can be provided that at the outside of the fixing tongue is a groove which extends from the side of the top wall inclinedly outwardly into the projection and is adapted for the engagement of a tool with which the latching connection between the fixing tongue and the side wall can be released by levering open. When the tool is pressed downwardly a rotational moment is applied to the projection which pivots outwardly its region which engages under the latching nose so that the latching connection can be easily released.

In another configuration of the connection between the top wall and the side walls of a chain link it is provided that the fixing tongues respectively engage into a recess in the side walls, that is open towards the top wall. The fixing tongues can be fixed therein in such a way that the top wall bears against the side walls under a prestressing.

In a preferred configuration of this kind of connection provided in the inwardly disposed surface of the recess is an opening which is let perpendicularly into the side wall in question and into which a substantially rotationally symmetrical closure portion with a central projection can be releasably latched. The closure portion can be inserted from the exterior into a through opening to the recess, wherein its outwardly facing end face is in alignment with the edge of the through opening. Its inwardly facing end face can be arranged at a spacing from the inwardly disposed surface of the recess, wherein a region of the fixing tongue fitted into the recess engages between that surface of the recess and the inwardly facing end face of the closure portion. At that region and the inwardly facing end face of the closure portion a cam and a cam guide can be in engagement with each other in such a way that upon rotation of the closure portion in the closure direction the fixing tongue is pulled with an increasing prestressing in a direction towards the bottom wall.

The cam can be in the form of a cam curve which is arranged concentrically at the inwardly facing end face of the closure portion and which narrows in the closure direction, wherein the cam guide is in the form of a groove which is arranged eccentrically relative to the opening and which also narrows in the closure direction. In a simpler configuration either the cam curve or the cam guide can narrow in the closure direction.

As an alternative to the above-described embodiment it can be provided that the cam curve is eccentric and the groove co-operating therewith is concentric.

In a further preferred embodiment the projection of the closure portion is substantially cylindrical and is latchable at its free end in press button-like fashion in the opening at the inside of the recess. Preferably the cam or the cam guide in the open position is arranged at the half, facing away from the top wall, of the end of the closure portion, beneath the projection. At its free end the fixing tongue can have a part-circular groove with which it can be fitted on to the projection of the closure portion, wherein the cam or the cam guide provided at the region in question of the fixing tongue is arranged above the part-circular groove. With that design configuration the fixing tongue can be fitted from above into the recess in the side wall in question after the closure portion has been fitted into the through opening in the side wall and has been latched with its projection at the inwardly disposed surface of the recess. In the open position the cam and the cam guide can be so arranged relative to each other that the cam can be introduced into the cam guide by rotation of the closure portion in the closure direction.

In a preferred development of that configuration the cam is mounted on the closure portion and the fixing tongue is of a plate-shaped configuration, wherein the cam guide is provided in the fixing tongue around the part-circular groove starting from the free end of the fixing tongue.

Desirably, at the outwardly facing end of the closure portion, there can be a recess for the engagement of a tool, with which the closure portion is rotatable. For example a screwdriver can be provided as the tool.

It will be appreciated that the structure which is converse to the above-described configurations is also considered, in which the fixing tongues at the side walls face towards the top wall and can be releasably fixed therein.

Two embodiments of the invention are described in greater detail hereinafter with reference to the drawing in which.

Figure 1:
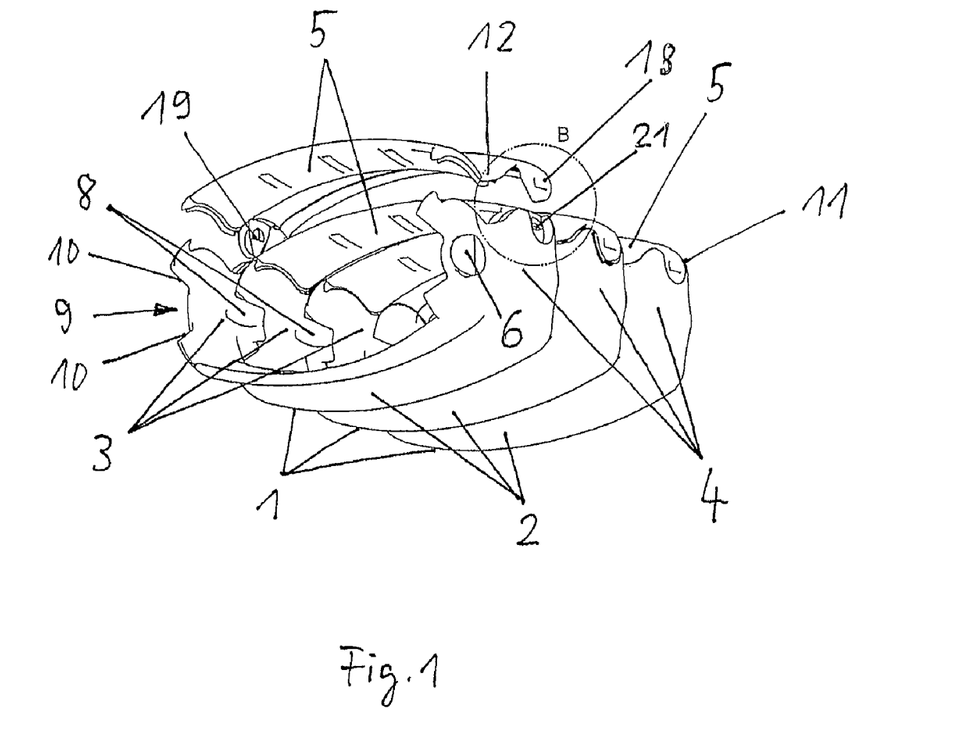
FIG. 1 shows a perspective view of a portion, consisting of three chain links, of a first embodiment of an energy guide chain.

FIG. 1 shows a portion of an energy guide chain, comprising three tubular chain links 1. Each chain link 1 comprises a bottom wall 2, mutually opposite side walls 3 and 4 laterally adjoining same and a top wall 5. As can be seen in the case of the chain link 1 at the left in FIG. 1 the top wall 5 can be removed from the side walls 3 and 4 for introducing and removing cables, hoses and the like into and out of the interior of the energy guide chain. The bottom walls 2 are formed integrally with the side walls 3 and 4.

Figure 2:
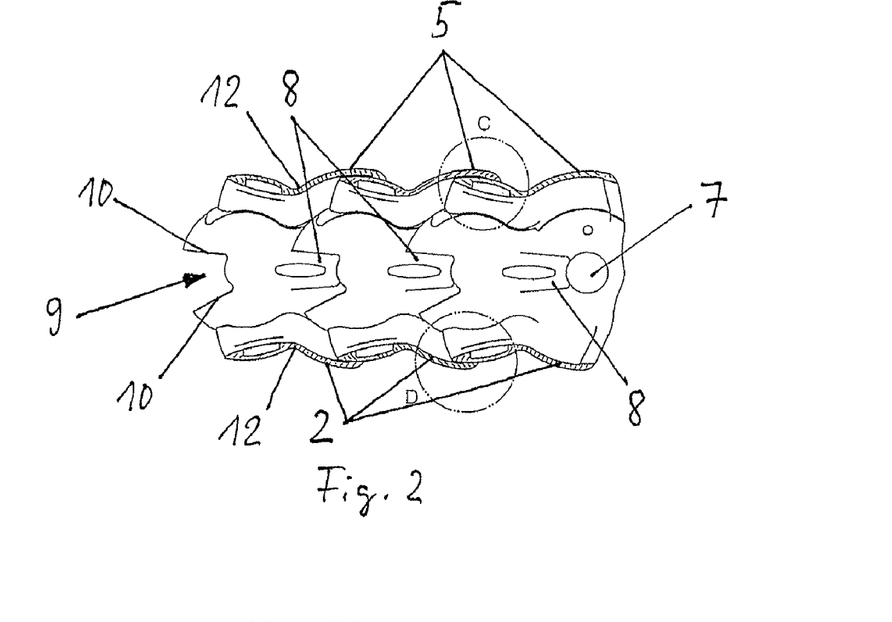
FIG. 2 shows a longitudinal section through the portion shown in FIG. 1 of the energy guide chain with fixed top walls.

For hingedly connecting the chain links 1 together they have hinge pins 6 projecting outwardly at an end facing in the longitudinal direction of the chain and hinge openings 7 formed at the opposite end at their inside, as can be seen from FIG. 2. The hinge openings 7 are in the form of blind bores so that after the chain links 1 are assembled the hinge connections are covered by the mutually overlapping regions of the side walls 3 and 4.

As can also be seen from FIGS. 1 and 2 provided at the insides of the side walls 3 and 4 are abutments 8 which engage into recesses 9 in the side walls 3 and 4 of an adjacent chain link 1 and co-operate with abutment surfaces 10 at the side edges of the recesses 9 to limit the pivotal movement of the chain links 1 into the straight position which is shown in FIGS. 1 and 2 and out of same into the angled position.

As can be seen from FIG. 1 and in particular the sectional view in FIG. 2 the top walls, side walls and bottom walls of adjacent chain links overlap telescopically over the entire pivotal angle between the aforementioned positions.

It will also be seen from FIG. 1 that the entire surface of the tubular chain links 1 is in the form of a surface which is curved convexly in the peripheral direction. In particular the top walls 5 and the bottom walls 2 have a marked convex curvature over their entire width while the central regions of the side walls 3 and 4 are approximately flat with only a slight convex curvature. The transitional zones 11 between the top walls 5 and the side walls 3 and 4 and between the bottom walls 2 and the side walls 3 and 4 involve a uniform severe curvature of approximately the same radius. The convexly curved top sides of the top walls 5, bottom walls 2 and transitional zones 11 are particularly important to prevent deposit of foreign bodies, in particular chips with sharp edges, on the surfaces in question, and to facilitate such foreign bodies falling off those surfaces.

As the energy guide chain is usually employed in such a way that it forms a lower run which goes into an upper run by way of a direction-changing deflection arc, foreign bodies can be deposited both on the lower run and also the upper run. It is therefore desirable for the cross-section of the chain links 1 to be symmetrical relative to the axis connecting the center of the two mutually opposite side walls 3 and 4 so that foreign bodies can laterally slip off equally easily from the top walls 5 in the region of the lower run as off the bottom walls 2 in the region of the top run. As the side walls 3 and 4 are oriented substantially vertically there is no need for a convex curvature outside the transitional zones 11.

As can be seen in particular from FIG. 2 both the outsides of the telescopically overlapping regions of the chain links 1 and also the mutually opposite surfaces in those regions have in sections perpendicularly to the pivot axes of the hinge pins 6 and hinge openings 7 curvatures which are substantially concentric relative thereto and which extend over the entire pivotal angle. Those convexly curved regions are connected together in the top walls 5 and the transitional zones between the top walls 5 and the side walls 3 and 4 by concavely curved regions 12. If foreign bodies should collect in the concavely curved regions which can also be of a V-shaped configuration they can easily slip off over the surface, which is convexly curved at the peripheral side, of the top and bottom walls 5 and 2 respectively and the transitional zones 11.

Figure 3:
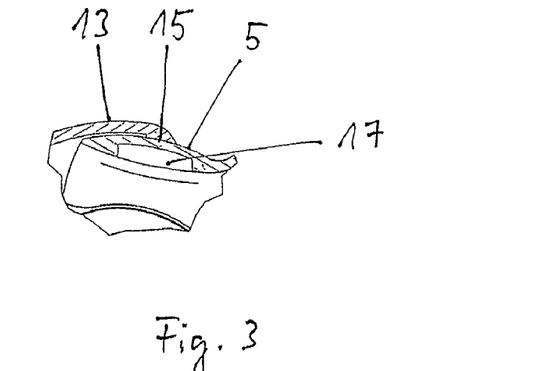
FIG. 3 shows an enlarged view of the region C in FIG. 2.
Figure 4:
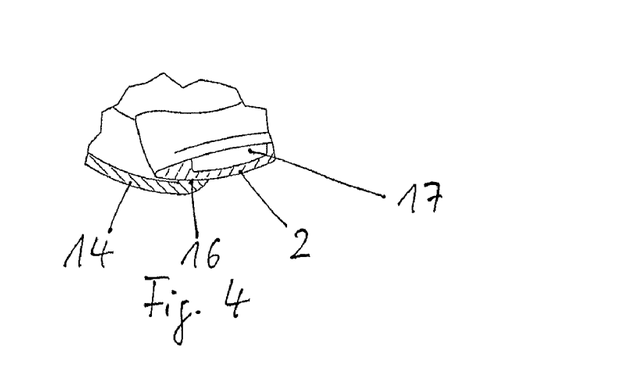
FIG. 4 shows an enlarged view of the region D in FIG. 2.
Figure 5:
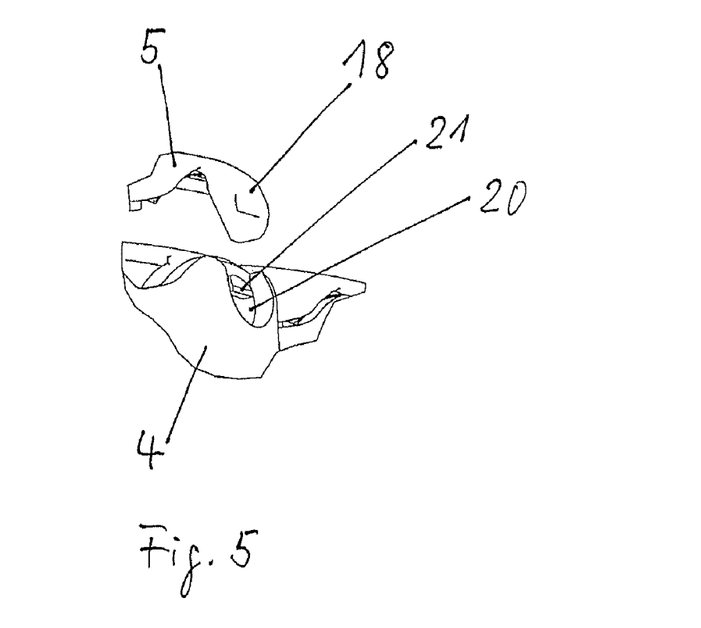
FIG. 5 shows an enlarged view of the region B in FIG. 1.

The regions of the top wall 5 and the bottom wall 2 which telescopically overlap outwardly the top wall 5 and the bottom wall 2 of an adjacent chain link 1 are in the form of scrapers 13 and 14 respectively, as can be seen in particular from the enlarged views of FIGS. 3 and 4 showing regions C and D in FIG. 2. The scrapers 13 and 14 at their free end regions have inwardly projecting portions 15 and 16 respectively with which they bear under a prestressing against the top side of the top wall and the bottom wall 5 respectively of the adjacent chain link.

As can also be seen from FIGS. 2, 3 and 4 the regions of the top and bottom walls 5 and 2 respectively, that are overlapped by the scrapers 13 and 14, have pockets 17 which extend transversely relative to the longitudinal direction of the chain links 1 and which can serve to receive transverse members (not shown in the drawing) between the side walls 3 and 4 to increase the stability of the chain links 1.

The connecting regions between the side walls 3 and 4 and the top wall 5 of a chain link 1 are in the form of a tongue-and-groove connection, as can be seen from FIG. 1.

Reference is made hereinafter to FIGS. 1 and 5-7 to describe in greater detail the connection of the top walls 5 of the chain links 1 to the side walls 3 and 4.

As shown in FIG. 1 the top walls 5 have fixing tongues 18 which extend downwardly from their side edges to the side walls 3 and 4 and which can be releasably connected to the side walls 3 and 4.

The connection is in the form of a latching connection, wherein the fixing tongues 18 at their inside each have a respective projection 19 which engages latchingly into an outwardly open recess 20 arranged at the side wall 3, 4 in question. In that case the outside of the fixing tongue 18 is aligned with the edge of the recess 20 so that in the closed position as shown for the right-hand chain link 1 in FIG. 1 that ensures a continuously steady curvature of the outside of the chain link in the transitional zones 11 between the top wall 5 and the side walls 3 and 4.

Provided in the recess 20 is a latching nose 21, under which the inwardly disposed projection 19 of the fixing tongue 18 latchingly engages.

The latching connection is also of such a configuration that the projections 19 engage under the latching noses 21 and latch therewith by applying pressure to the outside of the fixing tongues 18 in a direction towards the bottom wall 2. In that way the top walls 5 come to bear against the side walls 3 and 4 in question, with a prestressing force.

FIG. 1 shows the fixing of the top walls 5 to the side walls 2 and 3 by means of the three illustrated chain links 1 in three steps from left to right as follows. In regard to the chain link 1 shown at the left in FIG. 1 the top wall 5 is still released from the other part of the chain link 1 which is of a U-shaped configuration in cross-section and which is integrally formed from the bottom wall 2 and the side walls 3 and 4. The top wall 5 is then placed on the side walls 3 and 4 so that the tongue and groove in the connecting regions already at least partially engage into each other and the fixing tongues 18 bear with their projections 19 on the latching noses 21 in the recesses 20 in the side walls 3 and 4. That positioning of the top wall 5 is shown in FIG. 1 in relation to the chain link 1 shown in the center. In a further step applying pressure to the top side of the fixing tongues 18 causes the projections 19 thereof to latch to the latching noses 21 in the recesses 20. The connecting regions between the top wall 5 and the side walls 3 and 4 now bear against each other under a prestressing.

Figure 6:
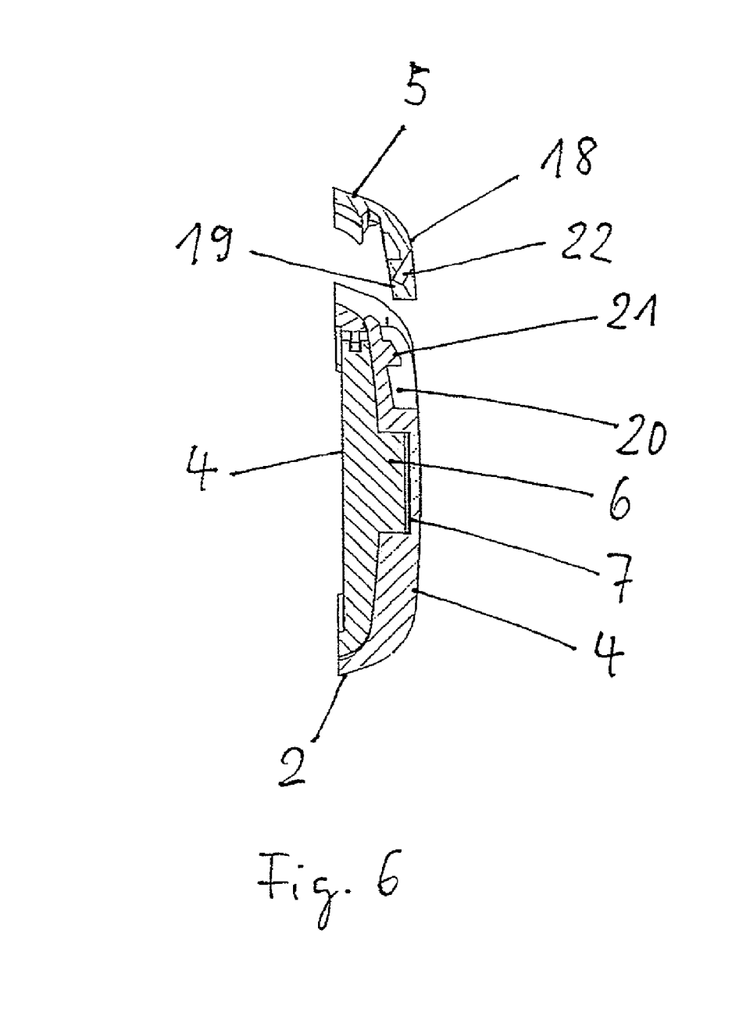
FIG. 6 shows a cross-sectional view of the side region with lifted top wall of the chain link shown at the left in FIG. 1.

The opened positioning of the top wall 5 with respect to a side wall 4 is shown once again in FIG. 6 in a cross-sectional view. The cross-sectional view is limited to the left-hand side region and passes approximately centrally through the fixing tongue 18 and the hinge connection of two hingedly interconnected chain links, as shown in the region of the left-hand chain link 1 in FIG. 1.

Figure 7:
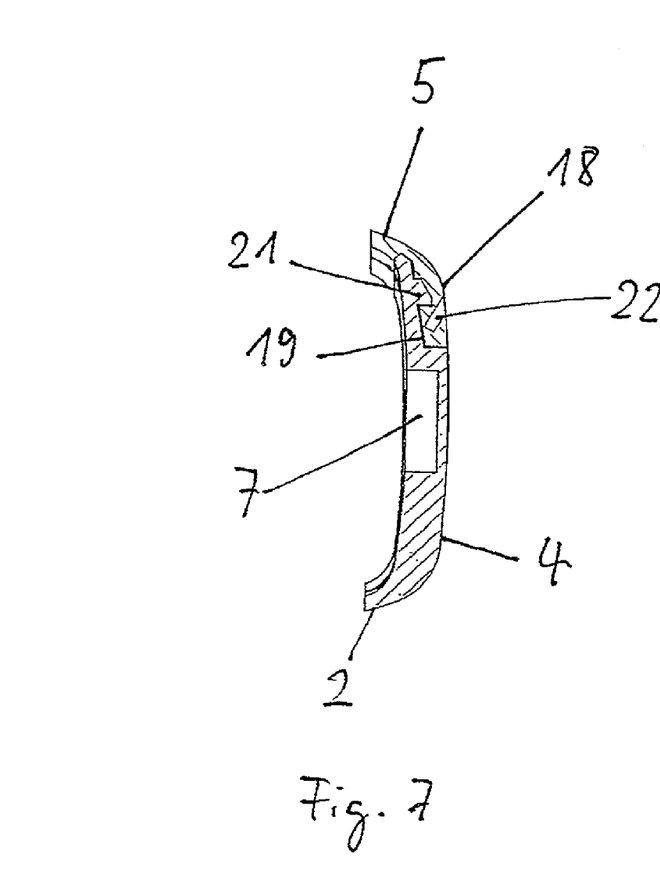
FIG. 7 shows a cross-sectional view of the side region with top wall fixed thereto of the chain link shown at the right in FIG. 1.

The completely closed positioning of the top wall 5 on the side wall 4 is shown in the sectional view in FIG. 7. That sectional view passes approximately centrally through the fixing tongue 18 and the hinge opening 7 in the case of the hinge link 1 shown at the right in FIG. 1.

As can further be seen from FIGS. 6 and 7 provided at the outside of each fixing tongue 18 is a groove 22 extending inclinedly from the outside towards the bottom wall 2 into the projection 19. The groove 22 is provided for the engagement of a tool, for example a screwdriver, with which the latching connection between the fixing tongue 18 and the side wall 4 can be released by being levered open. When the tool is pressed downwardly a rotational moment is applied to the projection 19 which pivots outwardly its region engaging under the latching nose 21 so that the latching connection can be easily released.

FIGS. 8 through 11 show a further embodiment which differs from the embodiment shown in FIGS. 1 through 7 in the manner of fastening the top walls 5 on the side walls 3 and 4.

Figure 8:
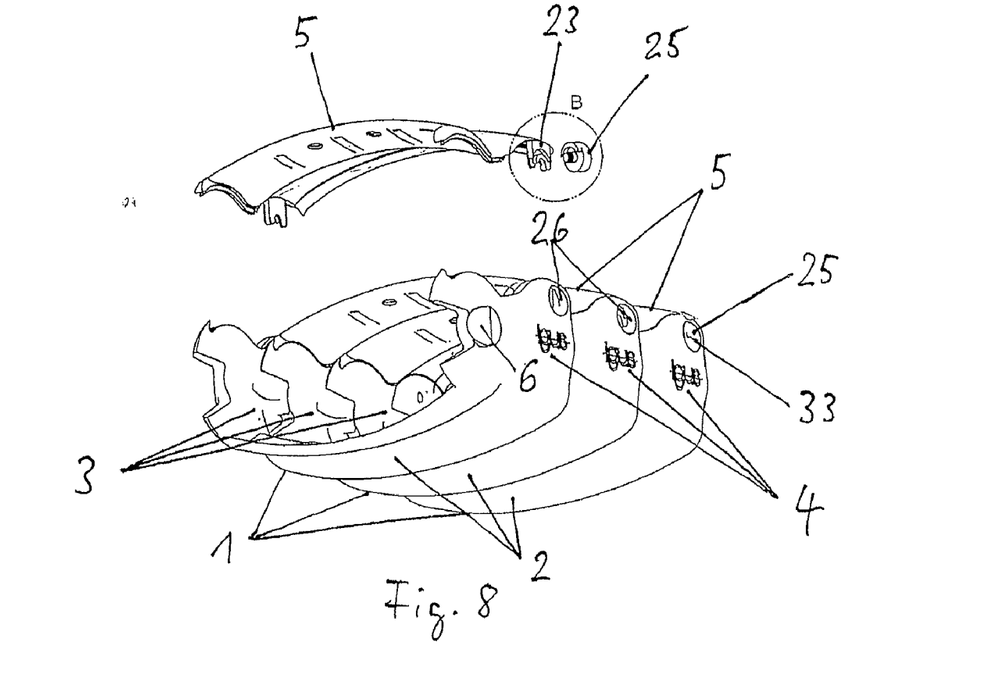
FIG. 8 shows a perspective view of a portion of a second embodiment of an energy guide chain with lifted top wall of the chain link shown at the left.
Figure 11:
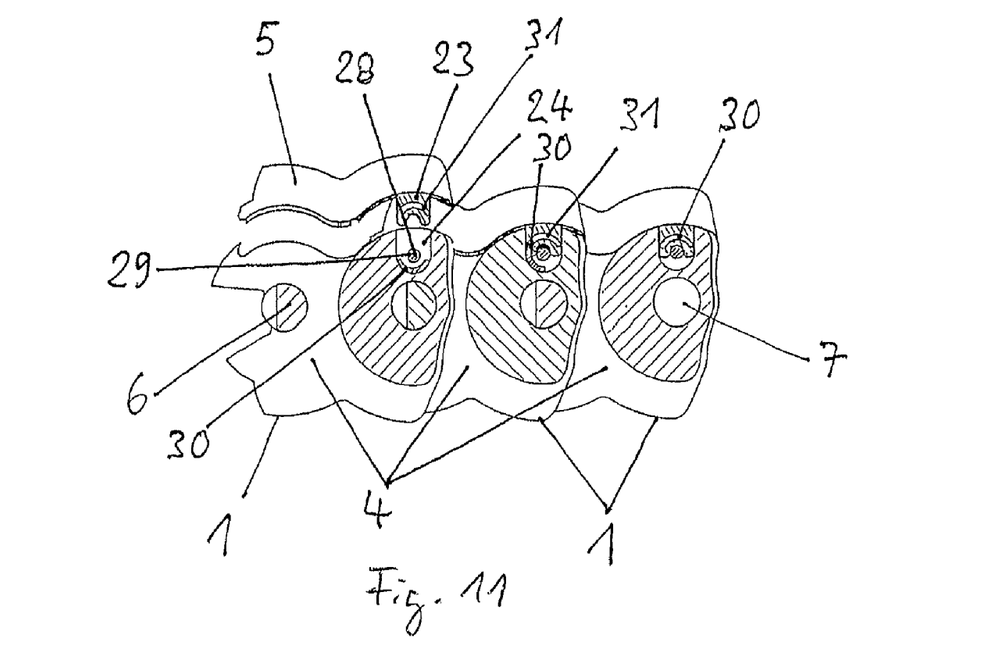
FIG. 11 shows a longitudinal section through the portion shown in FIG. 8 of the energy guide chain in the region of the hinge pins and fixing tongues.

As can be seen from FIG. 8 approximately corresponding to FIG. 1 the top walls 5 at their sides also have fixing tongues 23 adapted to engage into recesses 24, open towards the top walls 5, in the side walls 3 and 4, which are shown in longitudinal section through the chain links 1 in FIG. 11.

Figure 9:
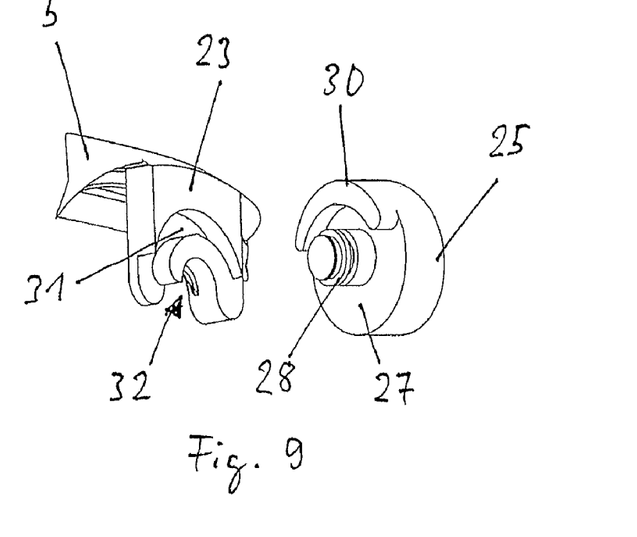
FIG. 9 shows an enlarged view of the region B in FIG. 8 with fixing tongue and closure portion.

The fixing tongues 23 can be fixed in the recesses 24 by closure portions 25 which are shown in greater detail in FIG. 9.

For that purpose a respective through opening 26 to the recess 24 is provided in the side walls 3 and 4, wherein the closure portion 25 can be fitted into the through opening and locked with the fixing tongue 23. The outwardly facing end face of the closure portion 25 is in alignment with the edge of the through opening 26 so that in the closure position once again that gives a surface which is steadily convexly curved in the transitional zone 11 between the top wall 5 and the side walls 3 and 4.

In the closure position the inwardly facing end face 27 is arranged at a spacing from the inwardly disposed surface of the recess 24, wherein the fixing tongue 23 which is fitted into the recess 24 engages between that surface of the recess and the inwardly facing end face 27 of the closure portion 25.

Figure 10:
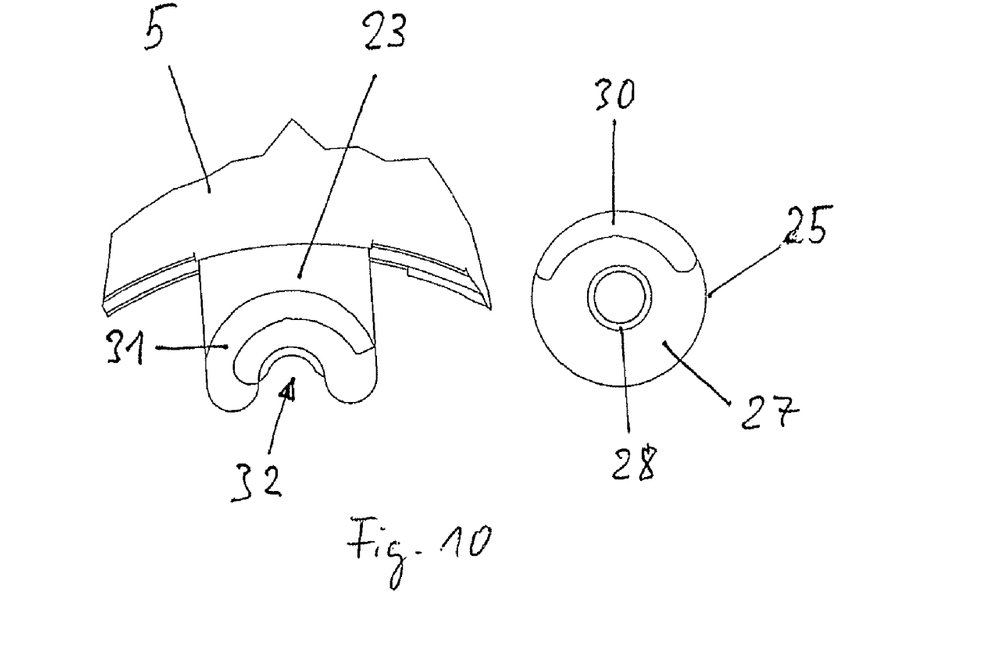
FIG. 10 shows a lateral plan view of the fixing tongue and a plan view of the inwardly facing end of the closure portion.

As can be seen from FIGS. 9 and 10 the closure portion 25 is of a substantially rotationally symmetrical configuration. It has a substantially cylindrical central projection 28, with the free end region of which it is latchable in a press button-like manner in an opening 29 shown in FIG. 11 at the inwardly disposed side of the recess 24.

To lock the fixing tongues 23 in the recesses 24 in the side walls 3 and 4 the closure portions 25, as can be seen from FIGS. 9 and 10, have a cam curve 30 in an outer peripheral region of their inwardly facing end face 27; the cam curve 30 engages into a cam guide in the form of a complementary groove 31 in the outwardly facing side of the plate-shaped fixing tongue 23. The cam curve 30 moves in the groove towards the free end thereof by rotation of the closure member 25 in the clockwise direction. For that purpose the cam curve 30 in the open position is arranged at the half, that faces away from the top wall 5, of the end face 27 of the closure portion 25, beneath the projection 28.

At its free end the fixing tongue 23 has a part-circular groove 32 with which it can be fitted on the projection 28 of the closure portion 25, in which case the groove 31 provided as the cam guide is arranged above the part-circular groove 32. Thus the fixing tongue 23 can be fitted into the recess 24 in the respective side wall 3 and 4 from above after the closure portion 25 has been fitted into the through opening 26 in the side wall 3 and 4 respectively and has been latched with its projection 28 in the opening 29 in the inwardly disposed side surface of the recess 24. In the open position the cam curve 30 and the groove 31 serving as the cam guide are so arranged relative to each other that the cam curve 30 can be introduced into the groove 31 serving as the cam guide by rotation of the closure portion 25 in the clockwise direction.

As can be seen in particular from FIG. 10 the cam curve 30 is concentric in relation to the cylindrical projection 28 while the groove 31 serving as the cam guide is eccentric with respect to the part-circular groove 32 and the projection 28 fitted therein of the closure portion 25. The arrangement of the groove 31 serving as the cam guide in relation to the cam curve 30 is such that the fixing tongue 23 is pulled with an increasing prestressing force in a direction towards the bottom wall 2 of the chain link 1 in question, upon rotation of the closure portion 25 in the closure direction. In the closure position therefore the top wall 5 bears with a prestressing against the side wall 4 in question.

The fixing of the top wall 5 to a side wall 4 is illustrated in three steps in FIG. 11. In the case of the chain link 1 shown at the left in FIG. 11 the top wall 5 is still completely released from the side wall 4. In this case the closure portion 25 is so arranged in the through opening 26 in the side wall 4 that the cam curve 30 is arranged at its inwardly facing end face 27 beneath the projection 28.

In a second step shown in FIG. 11 for the central chain link 1 the top wall 5 is fitted on to the side wall 4, the fixing tongue 23 engaging into the recess 24. The closure portion 25 is then rotated in the clockwise direction, in the closure direction, in which case the cam curve 30 is moved into the eccentrically arranged groove 31 serving as the cam guide. In that case the fixing tongue 23 is increasingly pulled with the top wall 5 in a direction towards the bottom wall 2, in which case the tongue-and-groove connection increasingly comes into engagement between the top wall 5 and the side wall 4.

For the chain link 1 shown at the right in FIG. 11, the drawing shows the closure position in which the cam curve 30 is pulled completely into the eccentrically extending groove 31 serving as the cam guide. The top wall 5 now bears against the side wall 4 with a prestressing.

When the closure portion 25 is rotated out of the closure position in the counter-clockwise direction into the open position the top wall 5 is slightly lifted off the side wall 4 so that, possibly with the aid of a tool inserted between the adjacent edges of the top wall 5 and the side wall 4, the top wall 5 can be easily released from the side wall 4.

A slot-shaped recess 33 indicated in FIG. 8, into which a screwdriver can engage, is provided at the outwardly facing end of the closure portion 25 for rotating it.

LIST OF REFERENCES 1 chain link
2 bottom wall
3 side wall
4 side wall
5 top wall
6 hinge pin
7 hinge opening
8 abutment
9 recess
10 abutment surface
11 transitional zone
12 concavely curved region
13 scraper
14 scraper
15 portions
16 portions
17 pocket
18 fixing tongue
19 projection
20 recess
21 latching nose
22 groove
23 fixing tongue
24 recess
25 closure portion
26 through opening
27 end face
28 projection
29 opening
30 cam curve
31 groove
32 groove
33 recess

What is claimed is:
1. An energy guide chain for guiding cables and hoses between two connection points movable relative to each other, comprising:
   a plurality of hingedly interconnected tubular chain links which each have a bottom wall, oppositely disposed side walls laterally adjoining the bottom wall and a top wall, wherein the top wall is removably connected to the side walls, the side walls each have a respective hinge pin and a hinge opening for hingedly connecting adjacent chain links and pivoting the adjacent links in two opposing pivotal directions, a pivotal angle of the adjacent chain links being limited in both pivotal directions by an abutment of one of the chain links, and the top walls, the side walls and the bottom walls of the adjacent chain links in a telescopically overlapping relationship over the entire pivotal angle, wherein the top wall and the bottom wall, a transitional zone between the top wall and the bottom wall, and the side walls of each chain link are convexly curved in a peripheral direction of the tubular chain links, and wherein the top wall and the bottom wall of each chain link includes a scraper which bears against the top wall and the bottom wall, respectively, of the adjacent chain link.

2. An energy guide chain as set forth in claim 1 wherein an entire outside surface of each tubular chain link is convexly curved in the peripheral direction.

3. An energy guide chain as set forth in claim 1 wherein an entire outside surface of each chain link is continuously curved in the peripheral direction.

4. An energy guide chain as set forth in claim 1 wherein each chain link has an outside in a cross-section that is shaped symmetrically relative to an axis connecting a center of the two oppositely disposed side walls.

5. An energy guide chain as set forth in claim 1 wherein the telescopically overlapping relationship of the chain links forms a telescopically overlapping region of the chain links and, in the telescopically overlapping region of the chain links, an outside of each of the chain links has a curvature which is substantially concentric with respect to a pivotal axis of the hinge pin and the hinge opening of the chain link.

6. An energy guide chain as set forth in claim 1 wherein, for each chain link, the top wall bears under a prestressing against the side walls of the chain link, the prestressing of the top wall against the side walls being directed towards the bottom wall.

7. An energy guide chain as set forth in claim 1 wherein the telescopically overlapping relationship of the chain links forms a telescopically overlapping region of the chain links and, in the telescopically overlapping region of the chain links, each of the chain links has a curvature which is substantially concentric with respect to a pivotal axis of the hinge pin and the hinge opening of the chain link and which extends at least over the entire pivotal angle.

8. An energy guide chain as set forth in claim 1 wherein a connecting region between one of the side walls and the top wall of each chain link and is in a form of a groove-and-tongue connection.

9. An energy guide chain as set forth in claim 1 wherein edge portions of one of the side walls and the top wall of each chain link bear against each other and overhang each other stepwise.

10. An energy guide chain as set forth in claim 1 wherein the top wall of each chain link has a fixing tongue which releasably connects to one of the side walls of the chain link.

11. An energy guide chain as set forth in claim 10 wherein a latching connection is provided between the fixing tongue and one of the side walls of each chain link.

12. An energy guide chain as set forth in claim 11 wherein the fixing tongue of each chain link has a projection which latchingly engages into an open recess arranged at one of the side walls of the chain link, the fixing tongue being in alignment with the recess.

13. An energy guide chain as set forth in claim 12 wherein the recess of each chain link has a latching nose under which a projection of the fixing tongue of the chain link engages.

14. An energy guide chain as set forth in claim 11 wherein the latching connection is of a configuration wherein the top wall of each chain link bears on the side wall of the chain link under a prestressing.

15. An energy guide chain as set forth in claim 11 wherein provided at an outside of the fixing tongue of each chain link is a groove which is adapted to be engaged by a tool with which the latching connection between the fixing tongue and the side wall is released.

16. An energy guide chain as set forth in claim 10 wherein the fixing tongue of each chain link engages into a recess in the side wall and is fixed therein in such a way that the top wall of the chain link bears on the side walls of the chain link under a prestressing.

17. An energy guide chain as set forth in claim 16 wherein provided in an inwardly disposed surface of the recess is an opening into which a substantially rotationally symmetrical closure portion with a central projection is releasably latchable, wherein the closure portion is inserted into a through opening to the recess, the closure portion having an outwardly facing end face in alignment with an edge of the through opening and an inwardly facing end face arranged at a spacing from the inwardly disposed surface of the recess, a region of the fixing tongue which is fitted into the recess engages between the surface of the recess and the inwardly facing end face of the closure portion and, at the region and the inwardly facing end face of the closure portion, a cam and a cam guide are in engagement with each other in such a way that, upon rotation of the closure portion in a closure direction, the fixing tongue is pulled with an increasing prestressing in a direction towards the bottom wall of the chain link.

18. An energy guide chain as set forth in claim 17 wherein the cam is in a form of a cam curve which is arranged concentrically at the inwardly facing end face of the closure portion and which narrows in the closure direction, and wherein the cam guide is in a form of a groove which is arranged eccentrically relative to the opening and which also narrows in the closure direction.

19. An energy guide chain as set forth in claim 17 wherein the projection of the closure portion is of a substantially cylindrical configuration and is latchable at a free end in a push button-like fashion in the opening at an inside of the recess, wherein the cam and the cam guide in an open position is arranged at a half, facing away from the top wall, of the end face of the closure portion beneath the projection and the fixing tongue at the free end has a part-circular groove which is fitted on to the projection of the closure portion and wherein the cam or the cam guide provided at the region of the fixing tongue is arranged above the part-circular groove so that the fixing tongue is fitted from above into the recess in the side wall after the closure portion has been fitted into the through opening in the side wall and has been latched with the projection at the inwardly disposed surface of the recess and in the open position the cam and the cam guide are so arranged relative to each other that the cam is introduced into the cam guide by rotation of the closure portion in the closure direction.

20. An energy guide chain as set forth in claim 19 wherein the cam is mounted on the closure portion and the fixing tongue is of a plate-shaped configuration, wherein the cam guide is provided in the fixing tongue around the part-circular groove starting from the free end of the fixing tongue.

21. An energy guide chain as set forth in claim 17 wherein provided at the outwardly facing end of the closure portion is a recess for an engagement of a tool with which the closure portion is rotatable.

* * * * *